United States Patent
Lu et al.

(10) Patent No.: US 12,452,021 B2
(45) Date of Patent: Oct. 21, 2025

(54) METHOD AND DEVICE FOR FEEDING BACK SIDELINK TRANSMISSION STATE

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 434 days.

(21) Appl. No.: 17/562,415

(22) Filed: Dec. 27, 2021

(65) Prior Publication Data

US 2022/0123905 A1 Apr. 21, 2022

Related U.S. Application Data

(63) Continuation of application No. PCT/CN2019/094942, filed on Jul. 5, 2019.

(51) Int. Cl.
*H04L 5/00* (2006.01)
*H04L 1/18* (2023.01)

(52) U.S. Cl.
CPC .............. *H04L 5/0055* (2013.01); *H04L 1/18* (2013.01)

(58) Field of Classification Search
None
See application file for complete search history.

(56) References Cited

U.S. PATENT DOCUMENTS

2017/0048829 A1 2/2017 Kim et al.
2018/0054237 A1* 2/2018 Tseng .................... H04B 7/026
(Continued)

FOREIGN PATENT DOCUMENTS

| CA | 3065831 A1 * | 3/2019 | .......... H04W 72/543 |
| CA | 3131039 A1 * | 8/2020 | ............ H04W 72/20 |
| CN | 107889157 A * | 4/2018 | ............ H04W 72/56 |

(Continued)

OTHER PUBLICATIONS

3GPP TS 38.213 v15.6.0 (Jun. 2019). Physical layer procedures for control (Release 15).*

(Continued)

*Primary Examiner* — Andrew C Oh
(74) *Attorney, Agent, or Firm* — BAYES PLLC

(57) ABSTRACT

The present application provides a method for feeding back a sidelink transmission state, comprising: a terminal device obtains an uplink feedback resource, the uplink feedback resource being used for transmitting sidelink feedback information; the terminal device performs sidelink feedback processing. The solution enables a network device to determine the data transmission state on a sidelink. After determining that data transmission on the sidelink fails, the network device can allocate retransmission resources to the terminal device, thereby improving success rate of sidelink transmission; or after determining that data transmission on the sidelink succeeds, the network device does not allocate retransmission resources to the terminal device any longer, thereby improving utilization of the resources.

12 Claims, 2 Drawing Sheets

(56) References Cited

U.S. PATENT DOCUMENTS

2018/0255532 A1 9/2018 Li et al.
2019/0364588 A1 11/2019 Lu et al.

FOREIGN PATENT DOCUMENTS

| CN | 108347313 | A | | 7/2018 | |
|---|---|---|---|---|---|
| CN | 109565333 | A | * | 4/2019 | H04W 4/40 |
| CN | 109792371 | A | * | 5/2019 | H04W 72/30 |
| CN | 109792594 | A | | 5/2019 | |
| CN | 110166214 | A | * | 8/2019 | H04W 72/23 |
| CN | 110169094 | A | * | 8/2019 | H04W 76/14 |
| CN | 110710233 | A | * | 1/2020 | H04W 88/04 |
| CN | 111200487 | A | * | 5/2020 | H04W 72/0446 |
| CN | 111432349 | A | * | 7/2020 | H04W 72/0453 |
| CN | 111435885 | A | * | 7/2020 | H04W 72/20 |
| CN | 111526488 | A | * | 8/2020 | H04W 72/20 |
| CN | 111740804 | A | * | 10/2020 | H04L 1/0026 |
| CN | 113273120 | A | * | 8/2021 | H04W 72/56 |
| EP | 3242515 | A1 | | 11/2017 | |
| EP | 3836669 | B1 | * | 10/2023 | H04L 5/0053 |
| JP | 7337926 | B2 | * | 9/2023 | H04L 1/1893 |
| KR | 20200145212 | A | * | 12/2020 | H04W 52/325 |
| WO | WO-2017171398 | A1 | * | 10/2017 | H04W 72/20 |
| WO | 2018145296 | A1 | | 8/2018 | |
| WO | WO-2019059707 | A1 | * | 3/2019 | H04W 72/02 |
| WO | WO-2019137481 | A1 | * | 7/2019 | H04W 72/23 |
| WO | WO-2019157719 | A1 | * | 8/2019 | H04L 1/1893 |
| WO | WO-2019157751 | A1 | * | 8/2019 | H04W 72/21 |
| WO | WO-2019159244 | A1 | * | 8/2019 | H04W 72/12 |
| WO | WO-2019215935 | A1 | * | 11/2019 | H04W 72/23 |
| WO | WO-2020061914 | A1 | * | 4/2020 | H04W 72/535 |
| WO | WO-2020136852 | A1 | * | 7/2020 | H04W 72/20 |
| WO | WO-2020222267 | A1 | * | 11/2020 | H04W 72/569 |
| WO | WO-2020250325 | A1 | * | 12/2020 | H04L 1/1854 |

OTHER PUBLICATIONS

The Examination Report dated May 31, 2023 from European patent application No. 19936945.5.
Notice of Reasons for Rejection dated Jun. 27, 2023 from the Japanese Application No. 2021-570235.
OPPO: "Enhancement of NR Uu to control LTE sidelink", 3GPP TSG-RAN WG1 Meeting #94; R1-1808907; Aug. 10, 2018, the whole document.
Huawei, HiSilicon: "Sidelink physical layer procedures for NR V2X", 3GPP TSG RAN WG1 Meeting #96; R1-1901537; Feb. 5, 2019, the whole document.
Supplementary Search Report Dated Jun. 14, 2022 From the Extended European Search Report (EESR) of the Application No. 19936945. 5.
The First Office Action with Examination Report Dated Apr. 27, 2022 From the Indian Patent Application No. 202127061075.
Fujitsu: "Discussion on HARQ-ACK feedback for NR-V2X", R1-1901944, 3GPP TSG RAN WG1 #96, Athens, Greece, Feb. 25-Mar. 1, 2019, 8 pages.
Nokia et al: "Discussion of physical layer procedures for sidelink", R1-1906079, 3GPP TSG-RAN WG1 Meeting #97, Reno, USA, May 13-17, 2019, 9 pages.
NTT Docomo Inc.: "NR Sidelink Resource Allocation Mechanism Mode 1", R1-1906206, 3GPP TSG RAN WG1 #97 Reno, USA, May 13-17, 2019, 6 pages.
Notice of Reasons for Rejection dated Dec. 12, 2023 from the Japanese Application No. 2021-570235.
International Search Report and the Written Opinion Dated Apr. 2, 2020 From the International Searching Authority Re. Application No. PCTCN2019094942, 10 pages.
CAICT Considerations on Resource Allocation of NR V2X Sidelink, R1-1809287 3GPP TSG RAN WG1 Meeting #94 Aug. 24, 2018, 6 pages.
CMCC Uu-based sidelink resource allocation/configuration, R1-1812881 3GPP TSG RAN WG1 Meeting #95 Nov. 16, 2018, 7 pages.
Vodafone New SID: Study on NR V2X, RP-181429 3GPP TSG RAN Meeting #80 Jun. 11-14, 2018, 5 pages.
The First Office Action dated Feb. 21, 2023 from Chinese patent application No. 202210102713.3.
The Notice of Allowance dated Apr. 26, 2023 from Chinese patent application No. 202210102713.3.
The Invitation to Indicate the Basis for Amendments dated Feb. 21, 2023 from European patent application No. 19936945.5.
Extended European search report issued in corresponding European patent application No. 24172891.4, dated Jul. 25, 2024, 10 pages.

* cited by examiner

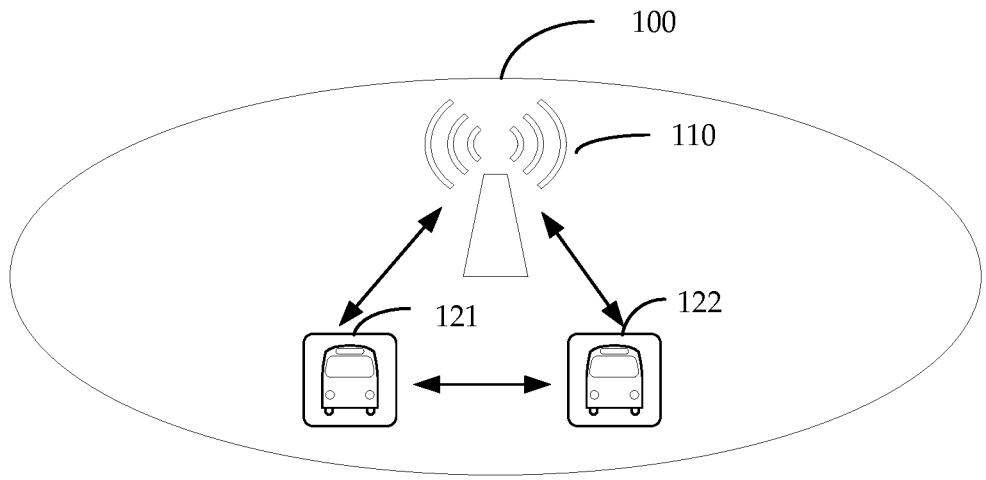

FIG. 1

200 obtaining, by a terminal device, an uplink feedback resource being used to transmit feedback information of a sidelink — S210 performing, by the terminal device, sidelink feedback processing — S220

FIG. 2

300 sending resource information to a terminal device by a network device, the resource information being used to indicate an uplink feedback resource, the uplink feedback resource being used to transmit feedback information of a sidelink — S310 detecting, by the network device, the feedback information of the sidelink on the uplink feedback resource — S320

FIG. 3

METHOD AND DEVICE FOR FEEDING BACK SIDELINK TRANSMISSION STATE

CROSS REFERENCE TO RELATED APPLICATIONS

This application is a continuation application of International Application No. PCT/CN2019/094942, filed on Jul. 5, 2019, which is incorporated herein by reference in its entirety.

BACKGROUND

The present application relates to communication technologies, and more particularly to a method and device for feeding back sidelink transmission.

The 5th-generation (5G) communication system supports vehicle to everything (V2X) communication. The V2X communication is a sidelink transmission technology. One terminal device can directly communicate with another terminal device without forwarding through a network device. Thus, the V2X communication has higher spectrum efficiency and lower transmission delay.

One way of sidelink transmission is that the terminal obtains sidelink resources from the network device and transmits data on the sidelink resources. Transmission failure is possible for the data transmitted on the sidelink. If the data transmission on the sidelink fails, the network device needs to allocate to the terminal device the resources required for retransmission. Therefore, how to determine the sidelink transmission by the network device is a problem that needs to be solved currently.

SUMMARY

The present application provides a method and device for feeding back sidelink transmission such that a network device is able to determine data transmission on a sidelink.

In a first aspect, a method for feeding back sidelink transmission is provided. The method includes obtaining, by a terminal device, an uplink feedback resource being used to transmit feedback information of a sidelink; and performing, by the terminal device, sidelink feedback processing.

In a second aspect, a method for determining sidelink transmission is provided. The method includes sending resource information to a terminal device by a network device, the resource information being used to indicate an uplink feedback resource, the uplink feedback resource being used to transmit feedback information of a sidelink; and detecting, by the network device, the feedback information of the sidelink on the uplink feedback resource.

In a third aspect, a device for feeding back sidelink transmission is provided for executing the method according to the first aspect. Specifically, the device includes functional modules being used to execute the method in the first aspect.

In a fourth aspect, a device for determining sidelink transmission is provided for executing the method according to the second aspect. Specifically, the device includes functional modules being used to execute the method in the second aspect.

In a fifth aspect, an apparatus for feeding back sidelink transmission is provided, which includes a processor and a memory. The memory is configured to store a computer program, and the processor is configured to call and run the computer program stored in the memory to implement the method of the first aspect.

In a sixth aspect, an apparatus for determining sidelink transmission is provided, which includes a processor and a memory. The memory is configured to store a computer program, and the processor is configured to call and run the computer program stored in the memory to implement the method of the second aspect.

In a seventh aspect, a chip is provided for executing the method according to the first aspect. Specifically, the chip includes a processor configured to call and run a computer program from a memory to enable an apparatus with the chip installed to execute the method of the first aspect.

In an eighth aspect, a chip is provided for executing the method according to the second aspect. Specifically, the chip includes a processor configured to call and run a computer program from a memory to enable an apparatus with the chip installed to execute the method of the second aspect.

In a ninth aspect, a computer readable storage medium is provided for storing a computer program, which enables a computer to execute the method of the first aspect.

In a tenth aspect, a computer readable storage medium is provided for storing a computer program, which enables a computer to execute the method of the second aspect.

In an eleventh aspect, a computer program product is provided, which includes computer program instructions enabling a computer to execute the method of the first aspect.

In a twelfth aspect, a computer program product is provided, which includes computer program instructions enabling a computer to execute the method of the second aspect.

In a thirteenth aspect, a computer program is provided, when running on a computer, enabling the computer to execute the method of the first aspect.

In a fourteenth aspect, a computer program is provided, when running on a computer, enabling the computer to execute the method of the second aspect.

The solutions proposed in the present application enable a network device to determine data transmission on a sidelink. After determining that data transmission on the sidelink fails, the network device can allocate retransmission resources to the terminal device, thereby improving success rate of sidelink transmission; or after determining that data transmission on the sidelink succeeds, the network device does not allocate retransmission resources to the terminal device any longer, thereby improving utilization of the resources.

BRIEF DESCRIPTION OF THE DRAWINGS

FIG. 1 is a schematic diagram illustrating a communication system to which the present application is applicable.

FIG. 2 is a schematic diagram illustrating a method for feeding back sidelink transmission provided in the present application.

FIG. 3 is a schematic diagram illustrating a method for determining sidelink transmission provided in the present application.

DETAILED DESCRIPTION

Figure 4:
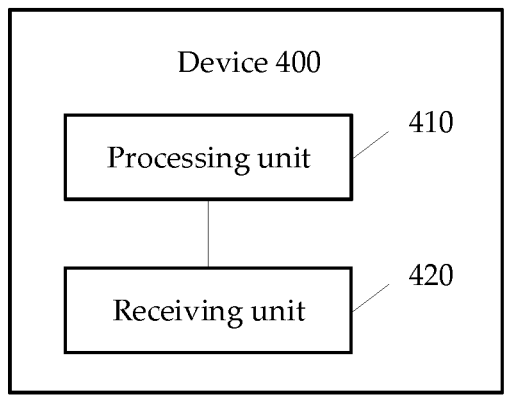
FIG. 4 is a schematic diagram illustrating a device for feeding back sidelink transmission provided in the present application.

The technical solutions in the embodiments of the present application are described below with reference to appending drawings of the embodiments of the present application. Obviously, the described embodiments are a part of embodiments of the present application but are not all of the embodiments. Based on the embodiments of the present application, all the other embodiments obtained by those of ordinary skill in the art without making any inventive effort are within the scope sought to be protected in the present application.

FIG. 1 is a schematic diagram illustrating a communication system 100 to which the present application is applicable.

The system 100 includes a network device 110, a terminal device 121 and a terminal device 122. The terminal device 121 and the terminal device 122 may be vehicles having a communication function, or may be in-vehicle electronic systems, or may be mobile phones, or may be wearable electronic devices, or may be other communications devices that comply with a V2X protocol.

The network device 110 may be an evolutional node B (eNB) in an LTE system, or may be a gNB in a 5G communications system. The foregoing network device is merely an example for illustration. The network device 110 may alternatively be a relay station, an access point, an in-vehicle device, a wearable device or any other type of device.

Before transmitting data through a sidelink, the terminal device 121 and the network device 110 may interact with each other using signaling so as to determine the resources used for data transmission, and then the terminal device 121 communicates with the terminal device 122 using the determined resources.

The above example is a centralized scheduling transmission mode (which may also be referred to as Mode 3) of the sidelink communication. In this mode, each time before the terminal device 121 sends data, the terminal device 121 needs to apply to the network device 110 for a resource, and sends V2X service data based on the resources allocated by the network device 110. Because the resources for the terminal device in the communication system 100 are uniformly allocated by the network device, a case in which a same resource is allocated to a neighboring terminal device does not occur. In this way, the centralized transmission mode can ensure better transmission reliability.

In order for the network device to allocate to the terminal device the resources required for retransmission when data transmission on the sidelink fails, the network device needs to determine transmission of the sidelink. The method and device for feeding back sidelink transmission proposed in the present application will be described in details below. For simplicity, the terminal device and the network device will not be followed by reference marks below.

FIG. 2 illustrates a method for sending sidelink data provided in the present application. The method 200 may be executed by the terminal device in the system 100. The method 200 includes the following:

In S210, the terminal device obtains an uplink feedback resource being used to transmit feedback information of a sidelink.

In S220, the terminal device performs sidelink feedback processing.

The terminal device is a sending side of the sidelink. The uplink feedback resource are the resources for the terminal device to send the feedback information of the sidelink to the network device. The feedback information of the sidelink is used to indicate reception of the data transmitted on the sidelink.

For example, if the data transmitted on the sidelink are received successfully, the terminal device may send an acknowledgement (ACK) to the network device on the uplink feedback resource, and the network device will no longer allocate to the terminal device the sidelink resources used for retransmission after receiving the ACK. If the data transmitted on the sidelink are not received successfully, the terminal device may send a negative acknowledgement (NACK) to the network device on the uplink feedback resource, and the network device may allocate to the terminal device the sidelink resources used for retransmission after receiving the NACK.

Therefore, the above solution enables the network device to determine the transmission of the data on the sidelink. After determining that data transmission on the sidelink fails, the network device can allocate retransmission resources to the terminal device, thereby improving success rate of sidelink transmission; or after determining that data transmission on the sidelink succeeds, the network device does not allocate retransmission resources to the terminal device any longer, thereby improving utilization of the resources.

As an optional implementation, before the terminal device obtains the uplink feedback resource, the method 200 further includes: sending, by the terminal device, sidelink processing capability information to the network device, wherein the sidelink processing capability information is used to indicate delay related to the sidelink feedback processing. The sidelink processing capability information is further used for the network device to determine the uplink feedback resource.

The processing capabilities on the sidelink may be different for different communication devices (a sending end or a receiving end). Communication devices with stronger processing capabilities can complete data processing quickly, and uplink feedback can be performed in a short time. Communication devices with weaker processing capabilities need a longer time to complete data processing, and a longer time is needed for performing the uplink feedback. Therefore, sending the sidelink processing capability information to the network device by the terminal device helps the network device accurately determine the time required for the terminal device to perform the uplink feedback and allocate suitable uplink feedback resource to the terminal device. In this way, it is avoided allocating too much uplink feedback resource, which causes a waste of resources or it is avoided allocating too little uplink feedback resource, which causes a failure in uplink feedback.

As an optional implementation, the sidelink processing capability information includes at least one of the following: delay 1, which is from obtaining a grant of sidelink resources by the terminal device to sending sidelink data on the sidelink resources by the terminal device; delay 2, which is from receiving the sidelink data by a receiving end of the sidelink to sending feedback information of the sidelink data by the receiving end; and delay 3, which is from receiving the feedback information of the sidelink data by the terminal device to sending the feedback information of the sidelink data by the terminal device.

For example, the terminal device may use three dedicated fields to send the above three types of delay to the network device. Among them, a field A is used to indicate the delay 1, a field B is used to indicate the delay 2, and a field C is used to indicate the delay 3. When all the three fields have valid values, it means that the terminal device has sent three pieces of delay information to the network device. When two of the three fields have valid values, it means that the terminal device has sent two pieces of delay information to the network device. When only one of the three fields has a valid value, it means that the terminal device has sent one piece of delay information to the network device. The messages carrying the three fields are not limited in the present application.

As an optional implementation, the sidelink processing capability information may also include a field, which indicates a sum of at least two of the three delay.

For example, the terminal device determines a sum of the delay 1 and the delay 2 and then sends the sum of the delay 1 and the delay 2 to the network device through the sidelink processing capability information. The terminal device may also determine a sum of the delay 1, the delay 2 and the delay 3 and then sends the sum of the delay 1, the delay 2 and the delay 3 to the network device through the sidelink processing capability information.

After the terminal device sends the sidelink data to the receiving end of the sidelink, the terminal device can detect the feedback information of the sidelink data. If the feedback information is received, it can be determined the content of the feedback information based on the following method: determining, by the terminal device, the feedback information of the sidelink as an ACK or a NACK based on first information, the first information being used to indicate probability of the ACK or the NACK for the feedback information of the sidelink detected by the terminal device.

When the feedback information of the sidelink is the ACK, the terminal device sends the ACK to the network device on the uplink feedback resource or does not send the ACK.

When the feedback information of the sidelink is the NACK, the terminal device sends the NACK to the network device on the uplink feedback resource or does not send the NACK.

The first information may be information in a communication protocol, or may also be information configured by the network device.

How the terminal device performs the sidelink feedback processing will be described below, that is, the terminal device sends the ACK or the NACK to the network device or does not send any feedback information.

As an optional implementation, when the terminal device receives at least two different feedback information of the sidelink on one sidelink feedback resource, Step S220 includes: sending the ACK on the uplink feedback resource by the terminal device; or sending the NACK on the uplink feedback resource by the terminal device; or not sending the ACK or the NACK by the terminal device.

The terminal device may send the ACK on the uplink feedback resource based on second information; or, the terminal device may send the NACK on the uplink feedback resource based on the second information; or, the terminal device may not send the ACK or the NACK based on the second information. The second information is used to indicate the way of feedback processing in Step S220.

The second information may be information in a communication protocol, or may also be information configured by the network device. The afore-mentioned at least two different feedback information may be ACK and NACK, for example. The two feedback information may come from two different sidelink receiving ends. The terminal device may feed back the ACK to the network device and then request the terminal device to retransmit resources when retransmission is requested by the receiving end that feeds back the NACK. The terminal device may also immediately feed back the NACK such that the network device allocates retransmission resources in time. Also, the terminal device may not send the ACK or the NACK (for example, the ACK and the NACK currently received by the terminal device are not the feedback information corresponding to the last retransmission), and the ACK or the NACK is sent to the network device after the feedback information of the last retransmission is received.

The above content provides a flexible uplink feedback solution.

As an optional implementation, when the terminal device does not receive the feedback information of the sidelink, Step S220 includes: sending the ACK to the network device on the uplink feedback resource by the terminal device when the sidelink carries multicast data and when a hybrid automatic repeat request (HARQ) feedback mode of the multicast data is a first feedback mode; or sending the NACK to the network device on the uplink feedback resource by the terminal device when the sidelink carries multicast data and when the HARQ feedback mode of the multicast data is a second feedback mode.

The first feedback mode is a feedback mode that only the NACK is fed back, that is, the receiving end only transmits HARQ NACK (Receiver UE transmits only HARQ NACK). The second feedback mode is a feedback mode that the NACK and the ACK are fed back, that is, the receiving end transmits HARQ ACK/NACK (Receiver UE transmits HARQ ACK/NACK).

For the first feedback mode, when the terminal device does not receive the feedback information, it indicates that the receiving end has received the data successfully, and the terminal device may send the ACK to the network device to indicate that the data transmission on the sidelink is successful. For the second feedback mode, when the terminal device does not receive the feedback information, it indicates that the receiving end does not receive the data and does not send the ACK/NACK, or it indicates that the terminal device does not receive the ACK/NACK sent by the receiving end. Therefore, the terminal device can send the NACK to the network device to indicate that the data transmission on the sidelink fails such that the network device can allocate retransmission resources, improving success rate of data transmission on the sidelink.

When the sidelink carries unicast data, the receiving end of the unicast data needs to feed back the reception regardless of whether the reception succeeds or fails. Therefore, when the terminal device does not receive the feedback information of the sidelink, it indicates that the receiving end of the unicast data does not receive the data and does not send the ACK/NACK, or when the terminal device does not receive the feedback information of the sidelink, it indicates that the terminal device does not receive the ACK/NACK sent by the receiving end of the unicast data. Therefore, the terminal device may send the NACK to the network device on the uplink feedback resource to indicate that the data transmission on the sidelink fails such that the network device can allocate retransmission resources, improving success rate of data transmission on the sidelink.

As an optional implementation, the sidelink carries multicast data. When the terminal device receives multiple feedback information of the multicast data on multiple sidelink feedback resources, Step S220 includes:

performing, by the terminal device, the feedback processing based on third information, the third information being used to indicate a proportion of a first type of feedback information and/or a second type of feedback information to the multiple feedback information.

The feedback information received by the terminal device includes ACK, NACK or discontinuous transmission (DTX). When the terminal device sends sidelink data and the receiving end of the sidelink needs to feed back the ACK or the NACK, the terminal device determines that the received feedback information is DTX if the terminal device does not receive the ACK or the NACK.

If the first type of feedback information is the ACK, the terminal device sends the ACK to the network device on the uplink feedback resource when the proportion of the ACK to the multiple feedback information is greater than or equal to a first proportion (for example, when the proportion of the ACK is greater than 90%).

If the first type of feedback information is the NACK and the second type of feedback information is the DTX, the terminal device sends the NACK or the DTX to the network device on the uplink feedback resource when the proportion of the NACK and/or the DTX to the multiple feedback information is greater than or equal to a second proportion (for example, the second proportion is 10%). Sending the DTX means that the terminal device does not feed back on the uplink feedback resource.

The terminal device may also determine the way to perform the uplink feedback processing based on an amount of feedback information of different types. That is, Step S220 may include:

performing, by the terminal device, the feedback processing based on fourth information, the fourth information being used to indicate an amount of feedback information of the first type and/or a second type in the multiple feedback information.

When the amount of the ACKs in the multiple feedback information is greater than or equal to a first value, the terminal device sends the ACK to the network device on the uplink feedback resource, wherein the first type of feedback information is the ACK.

When the amount of the NACKs and the DTXs in the multiple feedback information is greater than or equal to a second value, the terminal device sends the NACK to the network device on the uplink feedback resource, wherein the first type of feedback information is the NACK and the second type of feedback information is the DTX.

The services corresponding to the data in the multicast data of the sidelink have different requirements on quality of service (QoS). For example, some services require only 80% successful reception rate, and other services require 99% successful reception rate. Therefore, the afore-described uplink feedback solution based on based on amount or proportion has great adaptability in multicast data transmission scenarios.

As an optional implementation, Step S220 includes: performing, by the terminal device, initial transmission and retransmission of a transmission block by using multiple sidelink resources; receiving, by the terminal device, multiple feedback information corresponding to the transmission block; and sending, by the terminal device, target feedback information in the multiple feedback information to the network device on the uplink feedback resource, the target feedback information being used to indicate reception of sidelink data carried by a target resource in the multiple sidelink resources.

For the above-described case, the terminal device may not need to send on the uplink feedback resource the transmission of the data on each sidelink resource such that information overhead is reduced.

For example, the terminal device may send to the network device only the transmission of the data on the resource with the latest time-domain position among the multiple sidelink resources, that is, the resource with the latest time-domain position among the multiple sidelink resources is the target resource.

For another example, the terminal device may determine the resource corresponding to the ACK received for the first time among the multiple feedback information as the target resource.

The terminal device may send the target feedback information in the multiple feedback information to the network device on the uplink feedback resource based on a fifth information, which is used to indicate the target resource. The fifth information may be information in a communication protocol, or may also be information configured by the network device.

The terminal device may perform Step S220 based on the following schemes after performing initial transmission and retransmission of a transmission block on multiple sidelink resources and after receiving at least one feedback information corresponding to the transmission block.

Scheme 1: If the at least one feedback information includes an ACK, the terminal device stops transmitting on remaining resources in the multiple sidelink resources; and the terminal device sends at least one ACK to the network device on the uplink feedback resource. The at least one ACK corresponds to the remaining resources in a one-to-one correspondence.

In scheme 1, when the terminal device receives the ACK, it indicates that the sidelink data has been transmitted successfully. Therefore, there is no need to continue retransmission on the remaining resources, and the transmission on the remaining resources can be stopped, thereby reducing the information overhead and the power consumption of the terminal device.

Scheme 2: If the at least one feedback information includes an ACK, the terminal device sends at least one ACK to the network device on the uplink feedback resource. The at least one ACK corresponds to the remaining resources in a one-to-one correspondence.

In the above scheme, the terminal device can continue to send the retransmitted data on the remaining resources, but there is no need to analyze upcoming feedback information received. The terminal device directly feeds back the ACK to the network device, thereby reducing a burden on the terminal device.

Scheme 3: If the feedback information last received in at least one feedback information received by the terminal device is an ACK, the terminal device may send the at least one feedback information to the network device on the uplink feedback resource. After that, the terminal device stops send a feedback on the uplink feedback resource.

In Scheme 3, when the terminal device does not receive the ACK, the terminal device sends the feedback information to the network device; when the terminal device receives the ACK, the terminal device sends the ACK to the network device. The ACK indicates that the sidelink data has been transmitted successfully. Therefore, even if the reception of the sidelink data on some retransmission resources has not been fed back to the terminal device, the terminal device may no longer send the feedback information to the network device later, thereby reducing the information overhead of the terminal device.

Scheme 4: When at least one feedback information received by the terminal device includes an ACK, the terminal device only sends the ACK first received in the at least one feedback information to the network device on the uplink feedback resource.

In Scheme 4, when the terminal device does not receive the ACK, the terminal device does not send any feedback information on the uplink feedback resource; when the terminal device has the ACK first received, the terminal device sends the ACK on the uplink feedback resource and the terminal device no longer sends the feedback information to the network device later. When the data retransmission has not finished, it is meaningless to send the NACK to the network device. When the terminal device receives the ACK, it only needs to send one ACK to the network device. The above scheme can reduce the information overhead of the terminal device.

As an optional implementation, if the uplink feedback resource can only be used to transmit the feedback information of one transport block and the sidelink carries multiple transport blocks, then Step S220 includes:
 sending, by the terminal device, the NACK to the network device on the uplink feedback resource when the feedback information received by the terminal device corresponding to the multiple transmission blocks includes at least one NACK; or
 sending, by the terminal device, the ACK to the network device on the uplink feedback resource when the feedback information received by the terminal device corresponding to the multiple transmission blocks does not include the NACK.

When the terminal device sends the NACK to the network device, the network device needs to allocate retransmission resources for the transmission blocks. Therefore, the above solution can increase the probability of successful transmission of multiple transmission blocks.

When the uplink feedback resource can be used to transmit the feedback information of multiple transport blocks and the sidelink carries one transport block, the terminal device can select one resource from the uplink feedback resource and send the feedback information of the sidelink to the network device on the one resource.

As an optional implementation, the sidelink is a unicast link, and Step S220 includes:
 sending, by the terminal device, the ACK to the network device on the uplink feedback resource when the unicast link meets a first condition.

The first condition is one of the following conditions: a radio link failure (RLF) of the unicast link; a RLF of all activated unicast links of the terminal device; no activated unicast link for the terminal device; and no sidelink transmission for the terminal device.

When the RLF occurs on a unicast link, the transmission can hardly be successful even if the network device allocates retransmission resources. Therefore, when the RLF occurs on the unicast link, the terminal device may send the ACK to the network device to prevent the network device from allocating the retransmission resources, thereby reducing a waste of resources.

When the unicast link meets the first condition, the terminal device may further release the uplink feedback resource such that the network device can allocate the uplink feedback resource to the sending ends of other sidelinks.

The terminal device may also clear HARQ buffer or all the HARQ buffers associated with the unicast link.

The above solution can avoid a waste of resources and power consumption caused by data retransmission in the case of RLF.

From the perspective of the network device, a method for determining sidelink transmission provided in the present application will described below. As shown in FIG. 3, the method 300 includes the following:

In S310, the network device sends resource information to a terminal device, the resource information being used to indicate an uplink feedback resource, the uplink feedback resource being used to transmit feedback information of a sidelink.

In S320, the network device detects the feedback information of the sidelink on the uplink feedback resource.

Therefore, the above solution enables the network device to determine the transmission of the data on the sidelink. After determining that data transmission on the sidelink fails, the network device can allocate retransmission resources to the terminal device, thereby improving success rate of sidelink transmission; or after determining that data transmission on the sidelink succeeds, the network device does not allocate retransmission resources to the terminal device any longer, thereby improving utilization of the resources.

As an optional implementation, before the network device sends the resource information to the terminal device, the method 300 further includes:
 receiving, by the network device, sidelink processing capability information from the terminal device, wherein the sidelink processing capability information is used to indicate delay related to the sidelink feedback processing.

The network device may send the resource information to the terminal device based on the sidelink processing capability information.

As an optional implementation, the sidelink processing capability information includes at least one of the following: delay 1, which is from obtaining a grant of sidelink resources by the terminal device to sending sidelink data on the sidelink resources by the terminal device; delay 2, which is from receiving the sidelink data by a receiving end of the sidelink to sending feedback information of the sidelink data by the receiving end; and delay 3, which is from receiving the feedback information of the sidelink data by the terminal device to sending the feedback information of the sidelink data by the terminal device.

For example, the terminal device may use three dedicated fields to send the above three types of delay to the network device. Among them, a field A is used to indicate the delay 1, a field B is used to indicate the delay 2, and a field C is used to indicate the delay 3. When all the three fields have valid values, it means that the terminal device has sent three pieces of delay information to the network device. When two of the three fields have valid values, it means that the terminal device has sent two pieces of delay information to the network device. When only one of the three fields has a valid value, it means that the terminal device has sent one piece of delay information to the network device. The messages carrying the three fields are not limited in the present application.

As an optional implementation, the sidelink processing capability information may also include a field, which indicates a sum of at least two of the three delay.

For example, the terminal device determines a sum of the delay 1 and the delay 2 and then sends the sum of the delay 1 and the delay 2 to the network device through the sidelink processing capability information. The terminal device may also determine a sum of the delay 1, the delay 2 and the delay 3 and then sends the sum of the delay 1, the delay 2 and the delay 3 to the network device through the sidelink processing capability information.

Specific implementations and produced technical effects of the method 300 executed by the network device may be referred to relevant descriptions on corresponding embodiments in FIG. 2, which will not be repeated herein for simplicity.

The above describes in detail the examples of the method for feeding back sidelink transmission provided in the present application. It can be understood that, in order to realize the above-mentioned functions, a device for feeding back sidelink transmission includes hardware structures and/or software modules for performing respective functions. In connection with the units and algorithm steps of each example described the embodiments disclosed herein, those of ordinary skill in the art may realize that the present application can be implemented by hardware or a combination of computer software and hardware. Whether these functions are performed in hardware or software depends on the specific application and design constraints of the technical solution. Professional technicians can use different methods to implement the described functions for each specific application, but such implementation should not be considered to be beyond the scope of the present application.

The present application may divide a device for feeding back sidelink transmission into functional units according to the foregoing method examples. For example, respective functions may be divided into respective functional units, or two or more functions may be integrated into one processing unit. The above-mentioned integrated unit can be implemented in the form of hardware or software functional unit. It should be noted that the division of the unit in the present application is illustrative and is only a logical function division. In actual implementation, there may be another division manner.

FIG. 4 is a schematic diagram illustrating the structure of a device for feeding back sidelink transmission provided in the present application. The device 400 includes a processing unit 410 and a receiving unit 420. The processing unit 410 can control the receiving unit 420 to execute a receiving step.

The receiving unit 420 is used for obtaining an uplink feedback resource being used to transmit feedback information of a sidelink.

The processing unit 410 is used for performing sidelink feedback processing.

Optionally, the device 400 further includes a sending unit, which is used for:

sending sidelink processing capability information to the network device, the sidelink processing capability information being used to indicate delay related to the sidelink feedback processing.

Optionally, the sidelink processing capability information is further used for the network device to determine the uplink feedback resource.

Optionally, the sidelink processing capability information includes at least one of the following: delay which is from obtaining a grant of sidelink resources by the device 400 to sending sidelink data on the sidelink resources by the device 400; delay which is from receiving the sidelink data by a receiving end of the sidelink to sending the feedback information of the sidelink data by the receiving end; and delay which is from receiving the feedback information of the sidelink data by the device 400 to sending the feedback information of the sidelink data by the device 400.

Optionally, the sidelink processing capability information includes a delay value, and the delay value is a sum of at least two of the following delay: delay which is from obtaining a grant of sidelink resources by the device 400 to sending sidelink data on the sidelink resources by the device 400; delay which is from receiving the sidelink data by a receiving end of the sidelink to sending the feedback information of the sidelink data by the receiving end; and delay which is from receiving the feedback information of the sidelink data by the device 400 to sending the feedback information of the sidelink data by the device 400.

Optionally, the receiving unit 420 is further used for receiving the feedback information of the sidelink; the processing unit 410 is used for determining the feedback information of the sidelink as an ACK or a NACK; the sending unit sends the ACK to the network device on the uplink feedback resource or does not send the ACK when the feedback information of the sidelink is the ACK.

Optionally, the receiving unit 420 is further used for receiving the feedback information of the sidelink; the processing unit 410 is used for determining the feedback information of the sidelink as an ACK or a NACK; the sending unit sends the NACK to the network device on the uplink feedback resource or does not send the NACK when the feedback information of the sidelink is the NACK.

Optionally, the processing unit 410 is used for: determining the feedback information of the sidelink as the ACK or the NACK based on first information, the first information being used to indicate probability of the ACK or the NACK for the feedback information of the sidelink.

Optionally, when the device 400 receives at least two different feedback information of the sidelink on one sidelink feedback resource, the processing unit 410 is used for: sending the ACK on the uplink feedback resource by the sending unit; or sending the NACK on the uplink feedback resource by the sending unit; or not sending the ACK or the NACK.

Optionally, the processing unit 410 is used for: sending the ACK on the uplink feedback resource based on second information; or sending the NACK on the uplink feedback resource based on the second information; or not sending the ACK or the NACK based on the second information, wherein the second information is used to indicate a way of the feedback processing.

Optionally, when the device 400 does not receive the feedback information of the sidelink, the processing unit 410 is used for: sending the ACK to the network device on the uplink feedback resource by the sending unit when the sidelink carries multicast data and when a hybrid automatic repeat request (HARQ) feedback mode of the multicast data is a first feedback mode; or sending the NACK to the network device on the uplink feedback resource by the sending unit when the sidelink carries the multicast data and when the HARQ feedback mode of the multicast data is a second feedback mode.

Optionally, the first feedback mode is a feedback mode that only the NACK is fed back, and the second feedback mode is a feedback mode that the NACK and the ACK are fed back.

Optionally, when the device 400 does not receive the feedback information of the sidelink, the processing unit 410 is used for: sending, by the sending unit, the NACK to the network device on the uplink feedback resource when the sidelink carries unicast data.

Optionally, the sidelink carries multicast data, and when the device 400 receives multiple feedback information of the multicast data on multiple sidelink feedback resources, the processing unit 410 is used for: performing the feedback processing based on third information, the third information being used to indicate a proportion of a first type of feedback information and/or a second type of feedback information to the multiple feedback information.

Optionally, the processing unit 410 is used for: sending, by the sending unit, the ACK to the network device on the uplink feedback resource when the proportion of the ACK to the multiple feedback information is greater than or equal to a first proportion, wherein the first type of feedback information is the ACK.

Optionally, the processing unit 410 is used for: sending, by the sending unit, the NACK or discontinuous transmission (DTX) to the network device on the uplink feedback resource when the proportion of the NACK and/or the DTX to the multiple feedback information is greater than or equal to a second proportion, wherein the first type of feedback information is the NACK and the second type of feedback information is the DTX.

Optionally, the sidelink carries multicast data, and when the device 400 receives multiple feedback information of the multicast data on multiple sidelink feedback resources, the processing unit 410 is used for: performing the feedback processing based on fourth information, the fourth information being used to indicate an amount of the feedback information of the first type and/or a second type in the multiple feedback information.

Optionally, the processing unit 410 is used for: sending, by the sending unit, the ACK to the network device on the uplink feedback resource when the amount of the ACKs in the multiple feedback information is greater than or equal to a first value, wherein the first type of feedback information is the ACK.

Optionally, the processing unit 410 is used for: sending, by the sending unit, the NACK to the network device on the uplink feedback resource when the amount of the NACKs and the DTXs in the multiple feedback information is greater than or equal to a second value, wherein the first type of feedback information is the NACK and the second type of feedback information is the DTX.

Optionally, the processing unit 410 is used for: performing, by the sending unit, initial transmission and retransmission of a transmission block on multiple sidelink resources; receiving, by the receiving unit 420, multiple feedback information corresponding to the transmission block; and sending, by the sending unit, target feedback information in the multiple feedback information to the network device on the uplink feedback resource, the target feedback information being used to indicate reception of sidelink data carried by a target resource in the multiple sidelink resources.

Optionally, the target resource is a resource with the latest time-domain position among the multiple sidelink resources.

Optionally, the target resource is a resource of the multiple sidelink resources corresponding to the ACK received for the first time among the multiple feedback information.

Optionally, the processing unit 410 is used for: sending the target feedback information in the multiple feedback information to the network device on the uplink feedback resource based on a fifth information, the fifth information being used to indicate the target resource.

Optionally, the processing unit 410 is used for: performing, by the sending unit, initial transmission and retransmission of a transmission block on multiple sidelink resources; receiving, by the receiving unit 420, at least one feedback information corresponding to the transmission block; stopping transmitting on remaining resources in the multiple sidelink resources if the ACK is received; and sending, by the sending unit, at least one ACK to the network device on the uplink feedback resource, wherein the at least one ACK corresponds to the remaining resources in a one-to-one correspondence.

Optionally, the processing unit 410 is used for: performing, by the sending unit, initial transmission and retransmission of a transmission block on multiple sidelink resources; receiving, by the receiving unit 420, at least one feedback information corresponding to the transmission block; and sending, by the sending unit, at least one ACK to the network device on the uplink feedback resource, wherein the at least one ACK corresponds to the remaining resources in a one-to-one correspondence.

Optionally, the processing unit 410 is used for: performing, by the sending unit, initial transmission and retransmission of a transmission block on multiple sidelink resources; receiving, by the receiving unit 420, at least one feedback information corresponding to the transmission block, wherein the feedback information last received in the at least one feedback information is the ACK; sending, by the sending unit, the at least one feedback information to the network device on the uplink feedback resource; and stopping a feedback on the uplink feedback resource.

Optionally, the processing unit 410 is used for: performing, by the sending unit, initial transmission and retransmission of a transmission block on multiple sidelink resources; receiving, by the receiving unit 420, at least one feedback information corresponding to the transmission block; and sending, by the sending unit, only the ACK first received in the at least one feedback information to the network device on the uplink feedback resource.

Optionally, the uplink feedback resource can only be used to transmit the feedback information of one transport block and the sidelink carries multiple transport blocks, and the processing unit 410 is used for: sending, by the sending unit, the NACK to the network device on the uplink feedback resource when the received feedback information corresponding to the multiple transmission blocks includes at least one NACK; or sending, by the sending unit, the ACK to the network device on the uplink feedback resource when the received feedback information corresponding to the multiple transmission blocks does not include the NACK.

Optionally, the uplink feedback resource can be used to transmit the feedback information of multiple transport blocks and the sidelink carries one transport block, and the processing unit 410 is used for: sending, by the sending unit, the feedback information of the sidelink to the network device on one resource of the uplink feedback resource.

Optionally, the sidelink is a unicast link, and the processing unit 410 is used for: sending, by the sending unit, the ACK to the network device on the uplink feedback resource when the unicast link meets a first condition.

Optionally, the sidelink is a unicast link, and the processing unit 410 is used for: releasing the uplink feedback resource when the unicast link meets a first condition.

Optionally, the processing unit 410 is further used for: clearing HARQ buffer associated with the unicast link.

Optionally, the processing unit 410 is further used for: clearing all HARQ buffer associated with the unicast link.

Optionally, the first condition is one of the following conditions: a radio link failure (RLF) of the unicast link; a RLF of all activated unicast links of the device 400; no activated unicast link for the device 400; and no sidelink transmission for the device 400.

Figure 5:
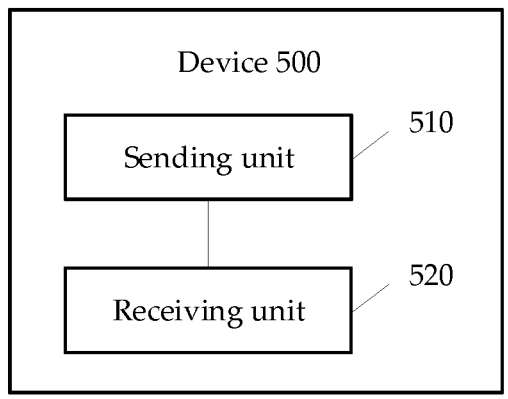
FIG. 5 is a schematic diagram illustrating a device for determining sidelink transmission provided in the present application.

FIG. 5 is a schematic diagram illustrating the structure of a device for determining sidelink transmission provided in the present application. The device 500 includes a sending unit 510 and a receiving unit 520.

The sending unit 510 is used for sending resource information to a terminal device, the resource information being used to indicate an uplink feedback resource, the uplink feedback resource being used to transmit feedback information of a sidelink. and The receiving unit 520 is used for detecting the feedback information of the sidelink on the uplink feedback resource.

Optionally, the receiving unit 520 is further used for: receiving sidelink processing capability information from the terminal device, the sidelink processing capability information being used to indicate delay related to the sidelink feedback processing.

Optionally, the sending unit 510 is used for: sending the resource information to the terminal device based on the sidelink processing capability information.

Optionally, the sidelink processing capability information includes at least one of the following: delay which is from obtaining a grant of sidelink resources by the terminal device to sending sidelink data on the sidelink resources by the terminal device; delay which is from receiving the sidelink data by a receiving end of the sidelink to sending the feedback information of the sidelink data by the receiving end; and delay which is from receiving the feedback information of the sidelink data by the terminal device to sending the feedback information of the sidelink data by the terminal device.

Optionally, the sidelink processing capability information includes a delay value, and the delay value is a sum of at least two of the following delay: delay which is from obtaining a grant of sidelink resources by the terminal device to sending sidelink data on the sidelink resources by the terminal device; delay which is from receiving the sidelink data by a receiving end of the sidelink to sending the feedback information of the sidelink data by the receiving end; and delay which is from receiving the feedback information of the sidelink data by the terminal device to sending the feedback information of the sidelink data by the terminal device.

Figure 6:
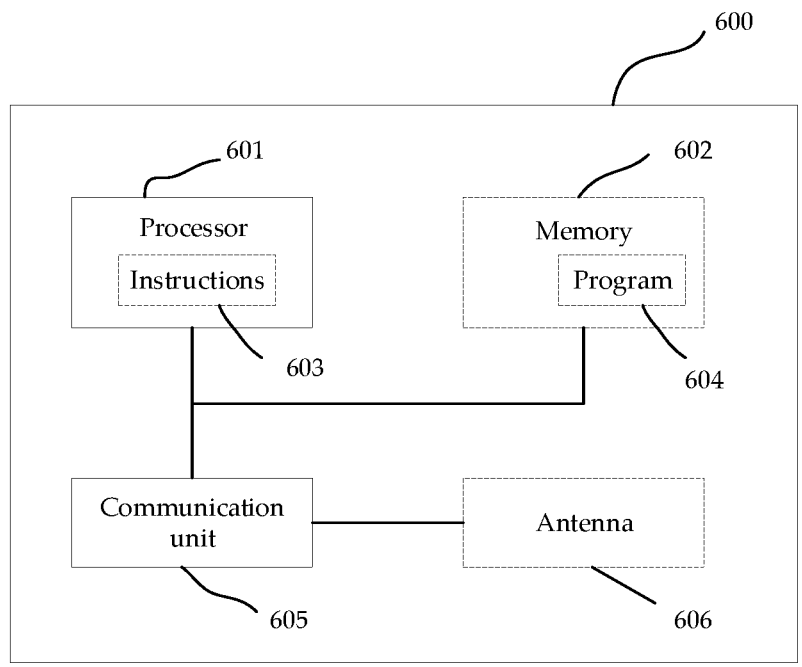
FIG. 6 is a schematic diagram illustrating an apparatus for feeding back sidelink transmission or an apparatus for determining sidelink transmission provided in the present application.

FIG. 6 is a schematic diagram illustrating an apparatus for feeding back sidelink transmission or an apparatus for determining sidelink transmission provided in the present application. The dotted line in FIG. 6 indicates that the unit or the module is optional. The apparatus 600 may be configured to implement the methods described in the foregoing method embodiments. The apparatus 600 may be a terminal device, a network device or a chip.

The apparatus 600 includes one or more processors 601, and the one or more processors 601 can support the apparatus 600 to implement the methods in the method embodiments corresponding to FIG. 2 and FIG. 3. The processor 601 may be a general-purpose processor or a special-purpose processor. For example, the processor 601 may be a central processing unit (CPU). The CPU can be configured to control the apparatus 600, execute a software program, and process data of the software program. The apparatus 600 may further include a communication unit 605 to implement signal input (reception) and output (transmission).

For example, the apparatus 600 may be a chip, and the communication unit 605 may be an input and/or output circuit of the chip, or the communication unit 605 may be a communication interface of the chip, and the chip can be used as a component of the terminal device or the network device or other wireless communication devices.

For another example, the apparatus 600 may be a terminal device or a network device, and the communication unit 605 may be a transceiver of the terminal device or the network device, or the communication unit 605 may be a transceiver circuit of the terminal device or the network device.

The apparatus 600 may include one or more memories 602, on which a program 604 is stored. The program 604 can be run by the processor 601 to generate instructions 603, so that the processor 601 executes the methods described in the foregoing method embodiments according to the instructions 603. Optionally, the memory 602 may also store data. Optionally, the processor 601 may also read data (e.g., the content in the table described above) stored in the memory 602. The data may be stored at the same storage address as the program 604, or the data may be stored at a different storage address from the program 604.

The processor 601 and the memory 602 may be separately provided or integrated, for example, integrated on a single board of the network device or a system on chip (SOC) of the terminal device.

The apparatus 600 may further include an antenna 606. The communication unit 605 is configured to implement the transceiver function of the apparatus 600 by the antenna 606.

The specific implementations of the method for feeding back sidelink transmission or determining sidelink transmission executed by the processor 601 may be referred to relevant descriptions on the method embodiments.

It should be understood that each step of the foregoing method embodiment may be completed by using a logic circuit of hardware in the processor 601 or an instruction in a form of software. The processor 601 may be a CPU, a digital signal processor (DSP), an application specific integrated circuit (ASIC), a Field Programmable Gate Array (FPGA), or other programming logic devices such as discrete gate, transistor logic devices, or discrete hardware components.

The present application also provides a computer program product, which, when executed by the processor 601, implements the method described in any method embodiment in the present application.

The computer program product may be stored in the memory 602, for example, a program 604, which is finally converted into an executable object file that can be executed by the processor 601 after preprocessing, compilation, assembly, and linking.

The present application also provides a computer-readable storage medium on which a computer program is stored, and the computer program, when executed by a computer, implement the method described in any method embodiment in the present application. The computer program can be a high-level language program or an executable target program.

The computer-readable storage medium is, for example, the memory 602. The memory 602 may be a volatile memory or a non-volatile memory, or the memory 602 may include both a volatile memory and a non-volatile memory. The non-volatile memory may be a read-only memory (ROM), a Programmable ROM (PROM), an Erasable PROM (EPROM), an Electrically EPROM (EEPROM) or a flash memory. The volatile memory may be a Random Access Memory (RAM), which is used as an external cache. By way of example, but not limitation, many forms of RAM are available, such as a static random access memory (SRAM), a dynamic random access memory (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM).

Those skilled in the art can clearly understand that, for the convenience and conciseness of the description, the specific working processes and technical effects of the device and apparatus described above can refer to the corresponding processes and technical effects in the foregoing method embodiments and are not repeated here.

In the several embodiments provided in the present application, it should be understood that the disclosed systems, devices, and methods may be implemented in other ways. For example, some features of the method embodiments described above can be ignored or not implemented, and the device embodiments described above are only schematic. For example, the division of the unit is only a logical function division. In actual implementation, there may be another division manner. Multiple units or components may be combined or can be integrated into another system. In addition, the coupling between the units or the coupling between the components may be direct coupling or indirect coupling, which may be electrical, mechanical or other forms.

It should be understood that in the various embodiments of the present application, the size of the sequence number of each process does not mean the order of execution. The execution order of each process should be determined by its function and internal logic, and should not constitute any limitation to the implementation process of the embodiments of the present application.

In addition, the terms "system" and "network" herein are often used interchangeably herein. The term "and/or" in this document is only a kind of association relationship describing related objects, which means that there can be three kinds of relationships, for example, A and/or B can mean: A exists alone, A and B exist simultaneously, and B exists alone of these three cases. In addition, the character "/" in this article generally represents that previous and next associated objects form an "or" relationship.

In short, the above descriptions are only preferred embodiments of the technical solutions of the present application, and are not used to limit the protection scope of the present disclosure. Any modification, equivalent replacement, improvement, etc. made within the spirit and principle of the present application shall be included in the protection scope of the present application.

What is claimed is:

1. A method for feeding back sidelink transmission, comprising:
    obtaining, by a terminal device, an uplink feedback resource being used to transmit feedback information of a sidelink; and
    performing, by the terminal device, sidelink feedback processing,
    wherein the performing, by the terminal device, the sidelink feedback processing comprises:
    performing, by the terminal device, initial transmission and retransmission of a transmission block by using multiple sidelink resources;
    receiving, by the terminal device, multiple feedback information corresponding to the transmission block; and
    sending, by the terminal device, target feedback information to a network device on the uplink feedback resource, the target feedback information being used to indicate reception of sidelink data carried by a target resource in the multiple sidelink resources, wherein the resource with the latest time-domain position among the multiple sidelink resources is the target resource, or the terminal device determines the resource corresponding to an acknowledgment (ACK) received for the first time among the multiple feedback information as the target resource;
    wherein when the terminal device does not receive the feedback information of the sidelink, the performing, by the terminal device, the sidelink feedback processing comprises:
    sending an ACK to the network device on the uplink feedback resource by the terminal device when the sidelink carries multicast data and when a hybrid automatic repeat request (HARQ) feedback mode of the multicast data is a first feedback mode; or
    sending a negative-acknowledgment (NACK) to the network device on the uplink feedback resource by the terminal device when the sidelink carries the multicast data and when the HARQ feedback mode of the multicast data is a second feedback mode; or
    sending, by the terminal device, a NACK to the network device on the uplink feedback resource when the sidelink carries unicast data.

2. The method of claim 1, wherein before the terminal device obtains the uplink feedback resource, the method further comprises:
    sending, by the terminal device, sidelink processing capability information to the network device, the sidelink processing capability information being used to indicate delay related to the sidelink feedback processing.

3. The method of claim 2, wherein the sidelink processing capability information is further used for the network device to determine the uplink feedback resource.

4. The method of claim 1, wherein the first feedback mode is a feedback mode that only the NACK is fed back, and the second feedback mode is a feedback mode that the NACK or the ACK is fed back.

5. A device for feeding back sidelink transmission, comprising:
    a receiving unit configured to obtain an uplink feedback resource being used to transmit feedback information of a sidelink; and
    a processing unit configured to perform sidelink feedback processing,
    wherein the processing unit is configured to:
    perform, by a sending unit, initial transmission and retransmission of a transmission block on multiple sidelink resources;
    receive, by the receiving unit, multiple feedback information corresponding to the transmission block; and
    send, by the sending unit, target feedback information to the network device on the uplink feedback resource, the target feedback information being used to indicate reception of sidelink data carried by a target resource in the multiple sidelink resources, wherein the resource with the latest time-domain position among the multiple sidelink resources is the target resource, or the resource corresponding to an acknowledgment (ACK) received for the first time among the multiple feedback information is determined as the target resource;
    wherein when the device does not receive the feedback information of the sidelink, the processing unit is configured to:
    send an ACK to the network device on the uplink feedback resource when the sidelink carries multicast data and when a hybrid automatic repeat request (HARQ) feedback mode of the multicast data is a first feedback mode; or
    send a negative-acknowledgment (NACK) to the network device on the uplink feedback resource when the sidelink carries the multicast data and when the HARQ feedback mode of the multicast data is a second feedback mode; or send a NACK to the network device on the uplink feedback resource when the sidelink carries unicast data.

6. The device of claim 5, further comprising a sending unit configured to:

send sidelink processing capability information to the network device, the sidelink processing capability information being used to indicate delay related to the sidelink feedback processing.

7. The device of claim 6, wherein the sidelink processing capability information is further used for the network device to determine the uplink feedback resource.

8. The device of claim 5, wherein the first feedback mode is a feedback mode that only the NACK is fed back, and the second feedback mode is a feedback mode that the NACK or the ACK is fed back.

9. A device for determining sidelink transmission, comprising:

a sending unit configured to send resource information to a terminal device, the resource information being used to indicate an uplink feedback resource, the uplink feedback resource being used to transmit feedback information of a sidelink; and a receiving unit configured to detect the feedback information of the sidelink on the uplink feedback resource, wherein the feedback information of the sidelink detected on the uplink feedback resource comprises target feedback information, the target feedback information is used to indicate reception of sidelink data carried by a target resource in multiple sidelink resources, and the multiple sidelink resources are used for the terminal device to perform initial transmission and retransmission of a transmission block, wherein the resource with the latest time-domain position among the multiple sidelink resources is the target resource, or the resource corresponding to an acknowledgment (ACK) received by the terminal device for the first time among the multiple feedback information is determined as the target resource;

wherein when the terminal device does not receive the feedback information of the sidelink, the receiving unit is further configured to:

receive an ACK on the uplink feedback resource when the sidelink carries multicast data and when a hybrid automatic repeat request (HARQ) feedback mode of the multicast data is a first feedback mode; or receive a NACK on the uplink feedback resource when the sidelink carries the multicast data and when the HARQ feedback mode of the multicast data is a second feedback mode; or receive a NACK from the terminal device on the uplink feedback resource when the sidelink carries unicast data.

10. The device of claim 9, wherein the receiving unit is further configured to:

receive sidelink processing capability information from the terminal device, the sidelink processing capability information being used to indicate delay related to the sidelink feedback processing.

11. The device of claim 10, wherein the sending unit is configured to:

send the resource information to the terminal device based on the sidelink processing capability information.

12. The device of claim 9, wherein the first feedback mode is a feedback mode that only the NACK is fed back, and the second feedback mode is a feedback mode that the NACK or the ACK is fed back.

* * * * *